(12) United States Patent
Idage et al.

(10) Patent No.: US 8,633,294 B2
(45) Date of Patent: Jan. 21, 2014

(54) LACTIC ACID-ISOSORBIDE COPOLYESTERS AND PROCESS FOR THE PREPARATION THEREOF

(71) Applicants: Bhaskar Bhairavnath Idage, Pune (IN); Susheela Bhaskar Idage, Pune (IN); Sivaram Swaminathan, Pune (IN)

(72) Inventors: Bhaskar Bhairavnath Idage, Pune (IN); Susheela Bhaskar Idage, Pune (IN); Sivaram Swaminathan, Pune (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 13/690,877

(22) Filed: Nov. 30, 2012

(65) Prior Publication Data

US 2013/0165622 A1 Jun. 27, 2013

Related U.S. Application Data (63) Continuation of application No. PCT/IN2011/000374, filed on Jun. 2, 2011.

(30) Foreign Application Priority Data

Jun. 2, 2010 (IN) .......................... 1277/DEL/2010

(51) Int. Cl.
*C08G 64/00* (2006.01)
*C08G 63/02* (2006.01)

(52) U.S. Cl.
USPC ........................... 528/271; 525/450; 528/272

(58) Field of Classification Search
USPC .................................. 525/450; 528/271, 272
See application file for complete search history.

(56) References Cited

U.S. PATENT DOCUMENTS

2008/0108759 A1    5/2008   Sodergard et al.
2013/0072642 A1*   3/2013   Lee et al. ...................... 525/450

FOREIGN PATENT DOCUMENTS

WO     2009021101 A1    2/2009

OTHER PUBLICATIONS

International Preliminary Report on Patentability Application No. PCT/IN2011/000374 Date of Completion: Apr. 23, 2012 5 pages.
International Search Report and Written Opinion of the International Searching Authority Application No. PCT/IN2011/000374 Completed: Aug. 24, 2011; Mailing Date: Sep. 7, 2011 10 pages.
Inkinen, et al.; "Readily Controllable Step-Growth Polymerization Method for Poly(lactic acid) Copolymers Having a High Glass Transition Temperature"; Biomacromolecules; Mar. 26, 2010; pp. 1196-1201 (abstract Only).

* cited by examiner

*Primary Examiner* — Terressa Boykin
(74) *Attorney, Agent, or Firm* — St. Onge Steward Johnston & Reens LLC (57) ABSTRACT

Copolyester with improved transition temperature, melting temperature and crystallinity including units derived from lactic acid and isosorbide, where the ratio of lactic acid to isosorbide ranges from 99:1 to 50:50.

14 Claims, 5 Drawing Sheets

LACTIC ACID-ISOSORBIDE COPOLYESTERS AND PROCESS FOR THE PREPARATION THEREOF

FIELD OF THE INVENTION

The present invention relates to lactic acid-isosorbide copolyester with improved properties such as glass transition temperature (Tg), melting temperature (Tm) and crystallinity from renewable resources.

Present invention further relates to process for the preparation of such copolyester with the quantitative incorporation of isosorbide (>90%) by a combination of polymerization techniques namely, melt phase disproportionation followed by solid state polymerization, solution phase disproportionation followed by solid state polymerization.

BACKGROUND OF THE INVENTION

The polymers based on aliphatic diols derived from biologically based resources are of great interest in the plastics industry and for the manufacturing industry for the preparation of materials and products that can be derived from inexpensive, renewable sources and that are also biodegradable and thereby have a low net environmental impact. The polymer that are of particular interest are based on isosorbide and more specifically referred to as 1,4:3,6-dianhydro-D-sorbitol, referred to hereinafter as isosorbide, the structure of which is illustrated below, is a chiral and relatively thermostable diol that is readily made from sugars and starches.

1,4:3,6-Dianhydro-D-sorbitol (Isosorbide)

It is opined that secondary alcohols such as isosorbide have poor reactivity and are sensitive to acid catalyzed reactions. As a result of the poor reactivity, polymers made with an isosorbide and acid monomer are expected to have a relatively low molecular weight.

References may be made to Journal, Biomacromolecules 2010, 11, 1196-1201" wherein copolyesters of L-lactic acid and isosorbide is reported. Similarly, the copolymers of lactic acid with succinic anhydride, butane tetra carboxylic acid or cyclohexane carboxylic acid were also prepared by step growth polymerization. However, the copolymers obtained had very low molecular weights and glass transition temperature.

References may be made to patent US20080108759, wherein improved polylactic acid polymers comprising units derived from lactic acid, isosorbide and poly carboxylic acid has been disclosed. It is further stated by the inventors that they have now discovered that the incorporation into a lactic acid polymer of units derived from isosorbide and units derived from a poly carboxylic acid can give a polymer having the desired higher glass transition temperature. Although isosorbide is known to elevate the glass transition temperature in certain other polymers, it is ineffective in lactic acid polymers and the presence of a poly carboxylic acid is necessary if the desired results are to be achieved. Similar advantages may be expected by the incorporation of these units into poly lactide polymers. Moreover, by appropriate selection of the relative amounts of the components of the polymer, it is possible to ensure that the polymer has a relatively high degradation temperature, an important consideration for materials used by the public.

Main objective of the present invention is to provide lactic acid-isosorbide copolyester with improved properties such as glass transition temperature (Tg), melting temperature (Tm) and crystallinity from renewable resources.

Another objective of the present invention is to prepare high molecular weight lactic acid-isosorbide copolyester with high glass transition temperatures (Tg's) with the quantitative incorporation of isosorbide (>90%) by a combination of polymerization techniques namely, melt phase disproportionation followed by solid state polymerization, solution phase disproportionation followed by solid state polymerization.

SUMMARY OF THE INVENTION

Accordingly, present invention provides copolyester comprising lactic acid and isosorbide, wherein ratio of lactic acid to isosorbide ranges from 99:1 to 50:50, the copolyester having improved glass transition temperature (Tg) in the range of 64 to 74° C., melting temperature (Tm) in the range of 173 to 186° C. and crystallinity in the range of 58 to 64%.

In an embodiment of the present invention, lactic acid is preferably in the range of 50 to 95 weight %.

In yet another embodiment of the present invention, isosorbide is preferably in the range of 5 to 50 weight %.

In yet another embodiment of the present invention, process for the preparation of copolyester utilizing the techniques selected from:
i) in situ ring opening polymerization of L-lactide with isosorbide;
ii) melt disproportionation of polylactic acid followed by the solid state polymerization;
iii) solution disproportionation of polylactic acid followed by the solid state polymerization.

In yet another embodiment of the present invention, In situ ring opening polymerization is carried out at a temperature in the range of 100° C. to 250° C.

In yet another embodiment of the present invention, melt disproportionation of polylactic acid followed by the solid state polymerization is carried out at a temperature in the range of 100° C. to 250° C.

In yet another embodiment of the present invention, solution disproportionation of polylactic acid followed by the solid state polymerization is carried out at a temperature in the range of 60° C. to 200° C.

In yet another embodiment of the present invention, intrinsic viscosity (IV), Number average molecular weight (Mn), Weight average molecular weight (Mw) and polydispersity index (PDI) are in the range of 0.52 dL/g to 1.16 dL/g, 37,200 g/mol to 74000 g/mol, 58,500 g/mol to 120,000 g/mol and 1.48 to 1.62 respectively.

In yet another embodiment of the present invention, said copolyester is useful for preparing films or shaped articles, suitable for packaging of substances such as food, electronic equipment or medicines.

DETAILED DESCRIPTION OF THE INVENTION

Present invention discloses lactic acid-isosorbide copolyester with glass transition temperature greater than 60 deg and melting temperature greater than 160 deg C. and crystallinity greater than 50%, wherein the ratio of lactic acid and isosorbide according to the present invention ranges from 99:1 to 50:50.

The isosorbide used for the preparation of lactic acid-isosorbide copolyester are sourced from natural resources. The synthesis of polymeric materials based on monomers from renewable feedstock is a steadily growing field of interest, since many of these monomers have structures which are not available from conventional sources.

The present invention further discloses a process for the preparation of lactic acid-isosorbide copolyester with thermal properties as disclosed herein by the melt/solid state polymerization.

Invention discloses a process for the preparation of lactic acid-isosorbide copolyester utilizing the techniques comprising:
  i) In situ ring opening polymerization of L-lactide with isosorbide;
  ii) Melt disproportionation of polylactic acid followed by the solid state polymerization and
  iii) Solution disproportionation of polylactic acid followed by the solid state polymerization.

Ring Opening Polymerization

Preparation of lactic acid-isosorbide (95:5) copolyester by in situ ring opening polymerization comprises reacting pure polymerization grade L-lactide and isosorbide in presence of tin-octoate in toluene under dry nitrogen. The content in the glass ampoule was dried at 60-70° C. under reduced pressure and the polymerization was carried out at 200° C. for 1 h. The glass clear polymer obtained was separated from the glass ampoule and characterized by ¹H NMR spectroscopy, gel permeation chromatography (GPC) and differential scanning calorimetry (DSC). The chemical structure of lactic acid-isosorbide copolymer and the incorporation of isosorbide into polylactic acid were determined by ¹H NMR spectroscopy.

Melt Phase Disproportionation and Solid State Polymerization

Preparation of lactic acid-isosorbide (95:5) copolyester by melt phase disproportionation and solid state polymerization comprises charging polylactic acid and isosorbide together with titanium isopropoxide in toluene into a glass ampoule under dry nitrogen. The content in the glass ampoule was dried at 60-70° C. under reduced pressure for 2-3 h. The glass ampoule was then sealed with gas burner and the disproportionation was carried out at 200° C. for 1 h. The solid polymer obtained was separated from the glass ampoule and characterized its chemical structure by ¹H NMR spectroscopy, gel permeation chromatography (GPC) and differential scanning calorimetry (DSC). The semi-crystalline polylactic acid-isosorbide copolymer thus obtained was subjected to solid state polymerization conditions in a fluidized bed glass reactor under a flow of nitrogen at 100° C. for 1 hour, 120° C. for 2 hours, 135° C. for 3 hours, 145° C. for 2 hours and 155° C. for 2 hours to obtain polylactic acid-isosorbide copolymer with improved Tg, Tm and crystallinity.

Solution Phase Disproportionation and Solid State Polymerization

Preparation of lactic acid-isosorbide copolyester by solution phase disproportionation and solid state polymerization comprises charging polylactic acid and isosorbide in chloroform followed by the addition of 0.5 wt % (based on polylactic acid) of titanium isopropoxide under dry nitrogen atmosphere. The disproportionation reaction was carried out at 65° C. for 5 h. The disproportionated polylactic acid was separated by precipitating in methanol. The polymer obtained was separated by filtration, dried at 60° C. under reduced pressure. The polymer obtained was characterized by ¹H NMR spectroscopy, gel permeation chromatography (GPC) and differential scanning calorimetry (DSC). The chemical structure of lactic acid-isosorbide copolymer and the incorporation of isosorbide into polylactic acid were determined by ¹H NMR spectroscopy. The semi-crystalline polylactic acid-isosorbide copolymer was subjected to solid state polymerization conditions in a fluidized bed reactor under a flow of nitrogen at 100° C. for 1 hour, 120° C. for 2 hours, 135° C. for 3 hours, 145° C. for 2 hours and 155° C. for 2 hours to obtain polylactic acid-isosorbide copolymer with improved Tg, Tm and crystallinity.

The resulting copolyester or compositions may be formed into films or shaped articles, such as containers for example bottles or boxes by known means and are especially suitable for packaging of substances for human or animal consumption, for example food and also for packing electronic equipment or medicines.

EXAMPLES

The following examples are given by way of illustration and therefore should not be construed to limit the scope of the present invention.

Comparative Example 1

Preparation of Poly (L-lactic Acid)

A 50 mL glass ampoule was charged with 10 g of polymerization grade L-lactide with the aid of a small funnel under dry nitrogen atmosphere. To it was added 0.5 mL of a 1% by weight solution of tin octoate in toluene under dry nitrogen. The content in the glass ampoule was dried at 60° C. under reduced pressure (0.01 mbar) for 2 hr. The glass ampoule was then sealed with gas burner and the ring opening polymerization was carried out at 200° C. for 1 hr. The glass clear polymer obtained was separated from the glass ampoule and characterized by ¹H NMR spectroscopy, gel permeation chromatography (GPC) and differential scanning calorimetry (DSC). The proton peaks assigned in the ¹H NMR spectrum were matching with the chemical structure of polylactic acid. The polylactic acid had an:
  Intrinsic viscosity (IV)=0.58 dL/g,
  Number average molecular weight (Mn)=41,300 g/mol,
  Weight average molecular weight (Mw)=67,000 g/mol and
  Polydispersity index (PDI)=1.62.

The DSC thermogram showed the Tg=59° C. and Tm=143° C.

Example 1

Preparation of Lactic Acid-Isosorbide (95:5) Copolyester By In Situ Ring Opening Polymerization A 50 mL glass ampoule was charged with 9.5 g of purified polymerization grade L-lactide and 0.5 g of isosorbide with the aid of a small funnel under dry nitrogen atmosphere. To it was added 0.5 mL of a 1% by weight solution of tin octoate in toluene under dry nitrogen. The content in the glass ampoule was dried at 60° C. under reduced pressure of 0.01 mbar for 2 hr. The glass ampoule was then sealed with gas burner and the polymerization was carried out at 200° C. for 1 hr. The glass clear polymer obtained was separated from the glass ampoule and characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra is in good agreement with the chemical structure of lactic acid-isosorbide copolymer and the incorporation of isosorbide was found to be 0.47 g (94%). The polylactic acid-isosorbide copolymer had an IV=0.48 dL/g, Mn=37,200 g/mol, Mw=58,500 g/mol and polydispersity index (PDI)=1.57.

The DSC thermogram showed the Tg=64° C., Tm=163° C.

The incorporation of isosorbide into polylactic acid increases the Tg from 59 to 64° C. and Tm from 143° C. to 163° C. as compared to comparative example 1 by in situ ring opening polymerization of dilactide with isosorbide.

Example 2

Figure 1:
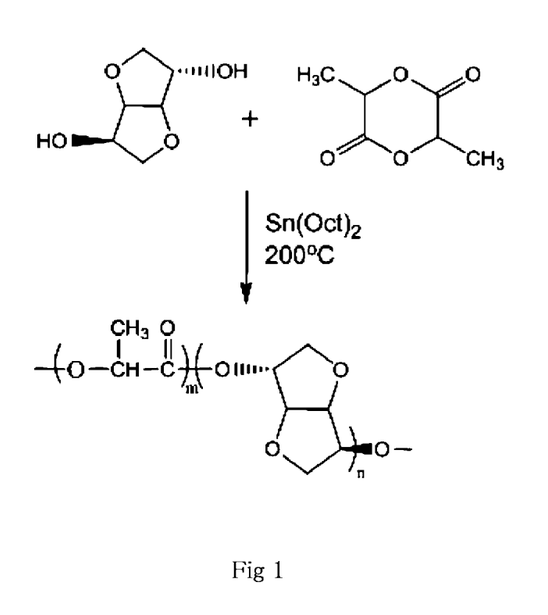
FIG. 1: Preparation of lactic acid-isosorbide copolyester by in situ ring opening polymerization
Figure 2:
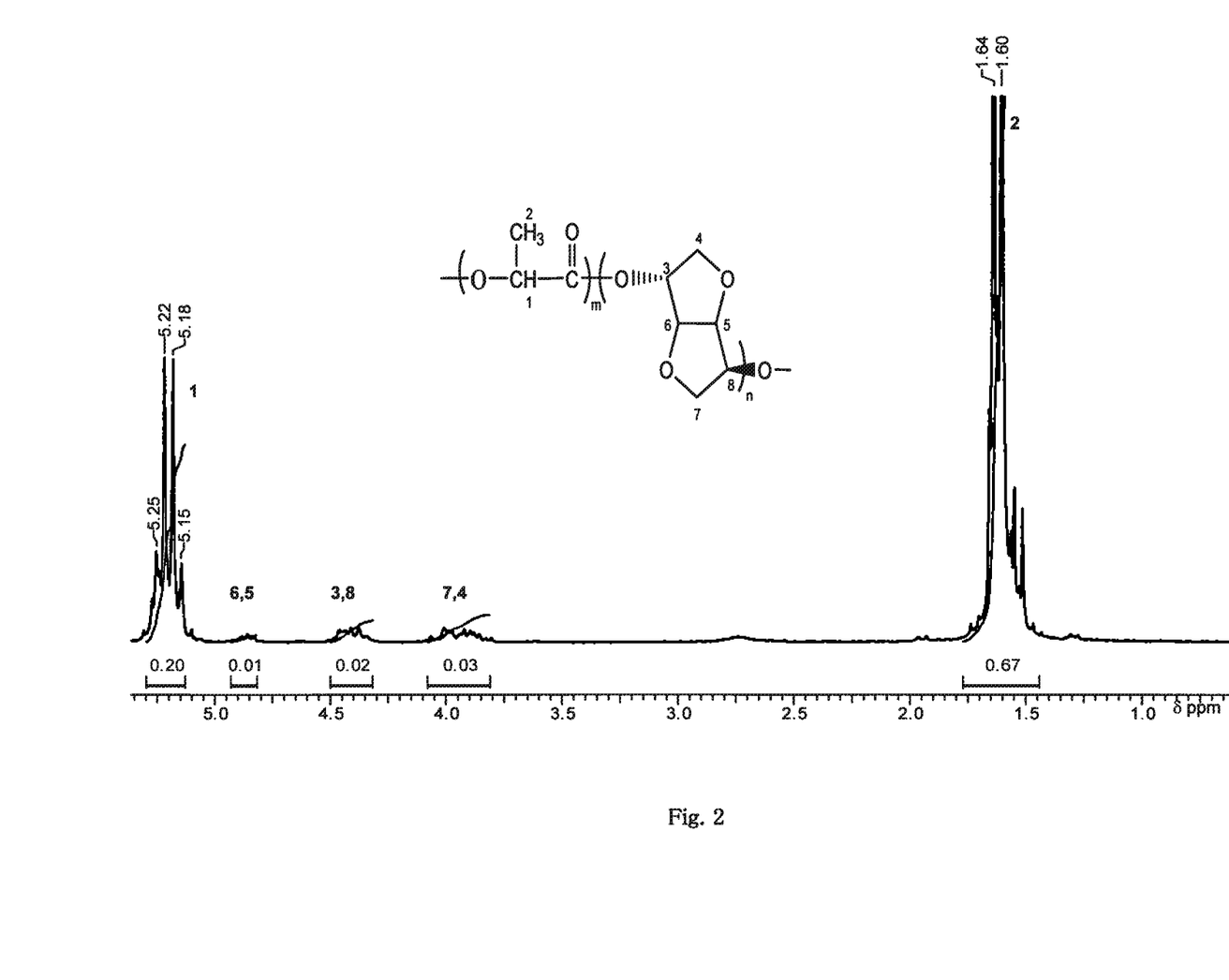
FIG. 2: ¹H NMR spectrum of Lactic acid-Isosorbide (90:10) copolyester prepared by in situ ring opening polymerization

Preparation of Lactic Acid-Isosorbide (90:10) Copolyester by In Situ Ring Opening Polymerization A 50 mL glass ampoule was charged with 9 g of purified polymerization grade L-lactide and 1 g of isosorbide with the aid of a small funnel under dry nitrogen atmosphere. To it was added 0.5 mL of a 1% by weight solution of tin octoate in toluene under dry nitrogen. The content in the glass ampoule was dried at 60° C. under reduced pressure (0.01 mbar) for 2 hr. The glass ampoule was then sealed with gas burner and the polymerization was carried out at 200° C. for 1 hr. The glass clear polymer obtained was separated from the glass ampoule and characterized by $^1$H NMR spectroscopy, gel permeation chromatography (GPC) and differential scanning calorimetry (DSC). The scheme for the preparation of lactic acid-isosorbide copolyester is shown in FIG. 1. The chemical structure of lactic acid-isosorbide copolymer and the incorporation of isosorbide into polylactic acid were determined by $^1$H NMR spectroscopy. The $^1$H NMR spectra of lactic acid-isosorbide copolyester is shown in FIG. 2. The $^1$H NMR spectra is in good agreement with the chemical structure of lactic acid-isosorbide copolymer and the incorporation of isosorbide was found to be 0.9 g (90%).

The polylactic acid-isosorbide copolymer had an IV=0.52 dL/g, Mn=40,300 g/mol, Mw=62,500 g/mol and polydispersity index (PDI)=1.55. The DSC thermogram showed the Tg=69° C., Tm=176° C.

The incorporation of isosorbide to polylactic acid increases the Tg from 59 to 69° C. and Tm from 143° C. to 176° C. as compared to comparative example 1 by in situ ring opening polymerization of dilactide with isosorbide.

Example 3

Preparation of Lactic Acid-Isosorbide (85:15) Copolyester by In Situ Ring Opening Polymerization A 50 mL glass ampoule was charged with 8.5 g of purified polymerization grade L-lactide and 1.5 g of isosorbide with the aid of a small funnel under dry nitrogen atmosphere. To it was added 0.5 mL of a 1% by weight solution of tin octoate in toluene under dry nitrogen. The content in the glass ampoule was dried at 60° C. under reduced pressure (0.01 mbar) for 2 hr. The glass ampoule was then sealed with gas burner and the polymerization was carried out at 200° C. for 1 hr. The glass clear polymer obtained was separated from the glass ampoule and characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra is in good agreement with the chemical structure of lactic acid-isosorbide copolymer and the incorporation of isosorbide was found to be 1.38 g (92%).

The polylactic acid-isosorbide copolymer had an IV=0.59 dL/g, Mn=45,400 g/mol, Mw=68,700 g/mol and polydispersity index (PDI)=1.51. The DSC thermogram showed the Tg=72° C., Tm=186° C.

The incorporation of isosorbide to polylactic acid increases the Tg from 59 to 72° C. and Tm from 143° C. to 186° C. as compared to comparative example 1 by in situ ring opening polymerization of dilactide with isosorbide.

Example 4

Preparation of Lactic Acid-Isosorbide (95:5) Copolyester by Melt Phase Disproportionation and Solid State Polymerization A 50 mL glass ampoule was charged with 9.5 g of polylactic acid (IV=1.6 dL/g), 0.5 g of isosorbide with the aid of a small funnel under dry nitrogen atmosphere. To it was added 0.5 mL of a 1% by weight solution of titanium isopropoxide in toluene under dry nitrogen. The content in the glass ampoule was dried at 60° C. under reduced pressure (0.01 mbar) for 2 hr. The glass ampoule was then sealed with gas burner and the disproportionation was carried out at 200° C. for 1 hr. The solid polymer obtained was separated from the glass ampoule and characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra is in good agreement with the chemical structure of lactic acid-isosorbide copolymer and the incorporation of isosorbide was found to be 0.45 g (90%). The solid lactic acid-isosorbide copolymer prepared by melt phase disproportionation was crushed and the particles passing through a 25 mesh screen were collected. The resulting semi-crystalline polylactic acid-isosorbide copolymer had an IV=0.25 dL/g, Tg=59° C., Tm=160° C. and crystallinity=32%.

The semi-crystalline polylactic acid-isosorbide copolymer was subjected to solid state polymerization conditions in a fluidized bed glass reactor under a flow of nitrogen at 100° C. for 1 hr, 120° C. for 2 hrs, 135° C. for 3 hrs, 145° C. for 2 hrs and 155° C. for 2 hrs.

The resulting copolymer had an IV=0.58 dL/g, Mn=44,800 g/mol, Mw=66,500 g/mol, polydispersity index (PDI)=1.48, Tg=64° C., Tm=173° C. and crystallinity=58%.

The incorporation of isosorbide to polylactic acid increases the Tg from 59 to 64° C., Tm from 160° C. to 173° C. and crystallinity from 32 to 58% respectively by melt phase disproportionation and solid state polymerization.

Example 5

Preparation of Lactic Acid-Isosorbide (90:10) Copolyester by Melt Phase Disproportionation and Solid State Polymerization A 50 mL glass ampoule was charged with 9 g of polylactic acid (IV=1.6 dL/g), 1 g of isosorbide with the aid of a small funnel under dry nitrogen atmosphere. To it was added 0.5 mL of a 1% by weight solution of titanium isopropoxide in toluene under dry nitrogen. The content in the glass ampoule was dried at 60° C. under reduced pressure (0.01 mbar) for 2 hr. The glass ampoule was then sealed with gas burner and the disproportionation was carried out at 200° C. for 1 h. The solid polymer obtained was separated from the glass ampoule and characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra is in good agreement with the chemical structure of lactic acid-isosorbide copolymer and the incorporation of isosorbide was found to be 0.92 g (92%.) The solid lactic acid-isosorbide copolymer prepared by melt phase disproportionation was crushed and the particles passing through a 25 mesh screen were collected. The resulting semi-crystalline polylactic acid-isosorbide copolymer had an IV=0.16 dL/g, Tg=64° C., Tm=168° C. and crystallinity=34%.

The semi-crystalline polylactic acid-isosorbide copolymer was subjected to solid state polymerization conditions in a fluidized bed reactor under a flow of nitrogen at 100° C. for 1 hr, 120° C. for 2 hrs, 135° C. for 3 hrs, 145° C. for 2 hrs and 155° C. for 2 hrs.

The resulting copolymer had an IV=0.60 dL/g, Mn=47,500 g/mol, Mw=72, 3000 g/mol, polydispersity index (PDI) =1.52, Tg=68° C., Tm=180° C. and crystallinity=60%.

The incorporation of isosorbide to polylactic acid increases the Tg from 64 to 68° C., Tm from 168° C. to 180° C. and crystallinity from 34 to 60% respectively by melt phase disproportionation and solid state polymerization.

Example 6

Figure 3:
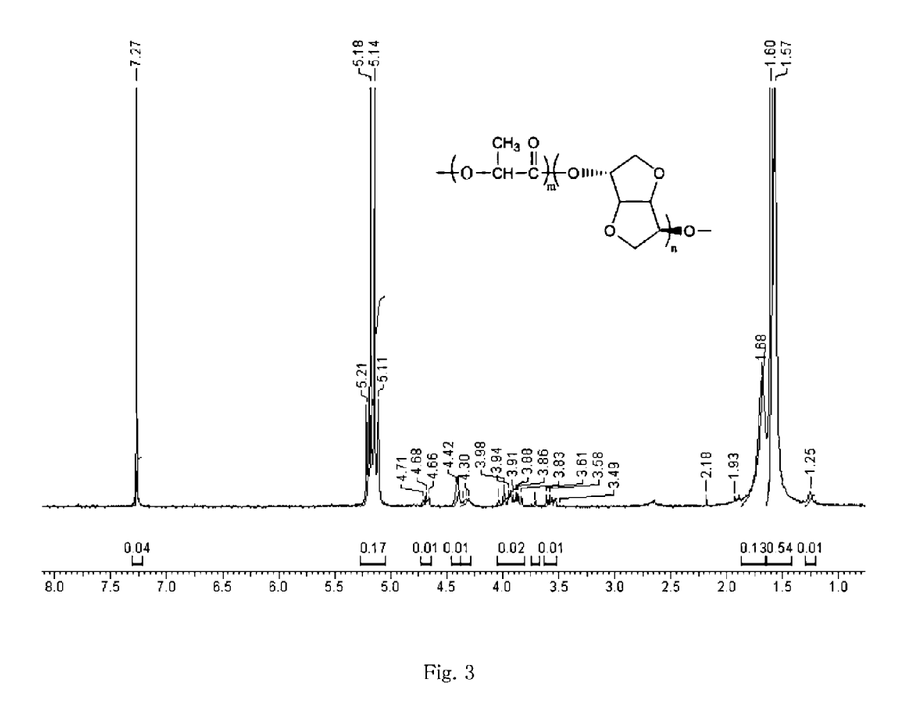
FIG. 3: ¹H NMR spectrum of Lactic acid-Isosorbide (90:10) copolyester prepared by melt disproportionation and solid state polymerization

Preparation of Lactic Acid-Isosorbide (90:10) Copolyester by Solution Phase Disproportionation and Solid State Polymerization A 250 mL round bottom was charged with 9 g of polylactic acid (IV=1.6 dL/g), 1 g of isosorbide and 100 mL of chloroform with the aid of a glass funnel. To it was added 0.5 wt % (based on polylactic acid) of titanium isopropoxide under dry nitrogen atmosphere. The disproportionation reaction was carried out at 65° C. for 5 hrs. The disproportionated polylactic acid was separated by precipitating chloroform solution in methanol. The polymer obtained was separated by filtration, dried at 60° C. under reduced pressure. The polymer obtained was characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra of lactic acid-isosorbide copolyester is shown in FIG. 3. The $^1$H NMR spectra is in good agreement with the chemical structure of lactic acid-isosorbide copolymer and the incorporation of isosorbide was found to be 0.92 g (92%). The solid lactic acid-isosorbide copolymer prepared by solution phase disproportionation was sieved and the particles passing through a 25 mesh screen were collected. The resulting semi-crystalline polylactic acid-isosorbide copolymer had an IV=1.0 dL/g, Tg=48° C., Tm=142° C. and crystallinity=28%.

The semi-crystalline polylactic acid-isosorbide copolymer was subjected to solid state polymerization conditions in a fluidized bed reactor under a flow of nitrogen at 100° C. for 1 hr, 120° C. for 2 hrs, 135° C. for 3 hrs, 145° C. for 2 hrs and 155° C. for 2 hrs.

Figure 4:
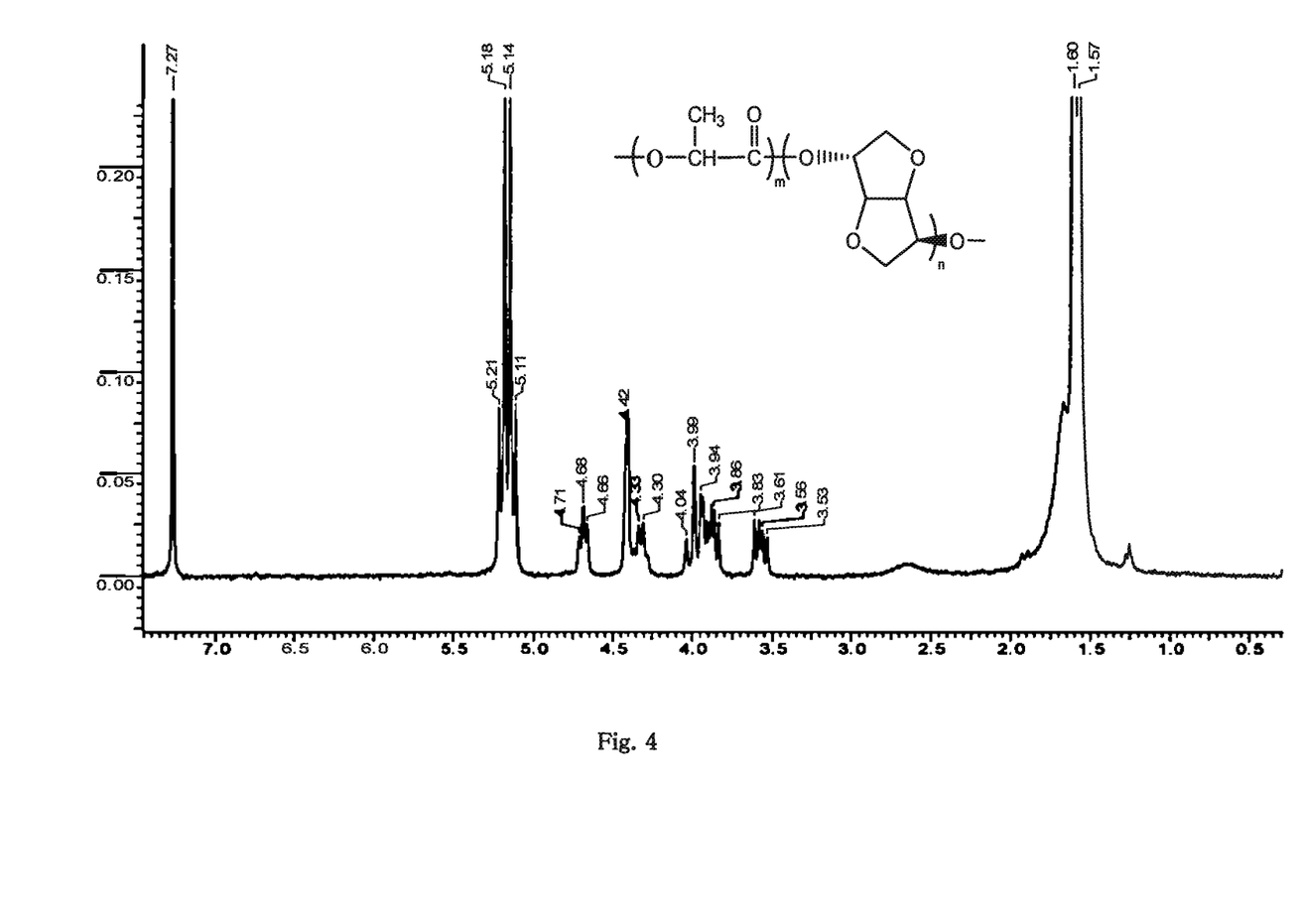
FIG. 4: ¹H NMR spectrum of Lactic acid-Isosorbide copolyester (80:20) prepared by solution disproportionation and solid state polymerization
Figure 5:
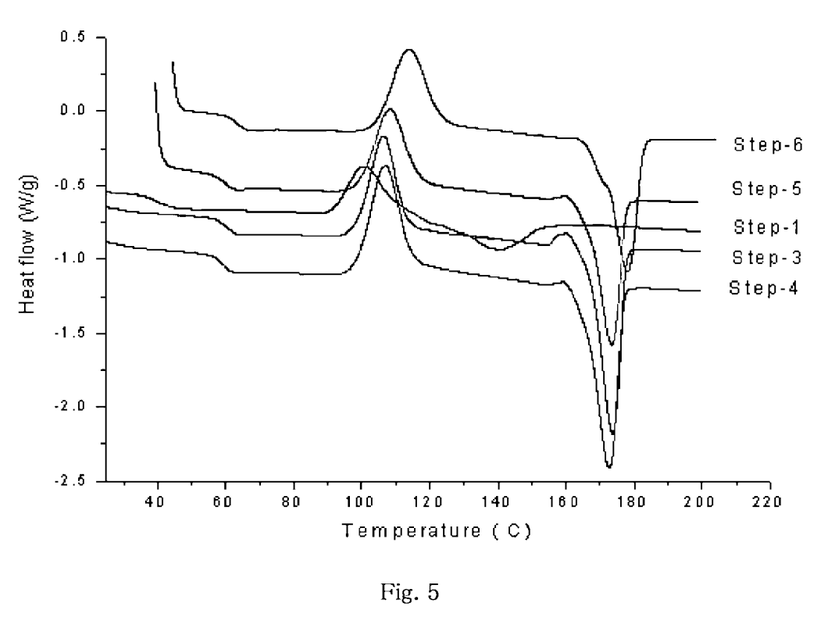
FIG. 5: DSC thermograms of polylactic acid-isosorbide copolyester (80:20) prepared by solution disproportionation and solid state polymerization. (Step 1: Solution disproportionated PLA-Isosorbide oligomer (80:20), Step 2: 100° C./1 hr, Step 3: 120° C./2 hr, Step 4: 135° C./3 hr, Step 5: 145° C./2 hr, Step 6: 155° C./2 hr)

The resulting copolymer had an IV=1.16 dL/g, Mn=74,000 g/mol, Mw=120,000 g/mol, polydispersity index (PDI) =1.62, Tg=66° C., Tm=184° C. and crystallinity=62%. The DSC thermograms of polylactic acid-isosorbide copolyester samples removed during the different steps of solid state polymerization are illustrated in FIG. 4.

The incorporation of isosorbide to polylactic acid increases the Tg from 48 to 66° C., Tm from 142° C. to 184° C. and crystallinity from 28 to 62% respectively by solution disproportionation and solid state polymerization.

Example 7

Preparation of Lactic Acid-Isosorbide (80:20) Copolyester by Solution Phase Disproportionation and Solid State Polymerization A 250 mL round bottom was charged with 8 g of polylactic acid (IV=1.6 dL/g), 2 g of isosorbide and 100 mL of chloroform with the aid of a glass funnel. To it was added 0.5 wt % (based on polylactic acid) of titanium isopropoxide under dry nitrogen atmosphere. The disproportionation reaction was carried out at 65° C. for 5 h. The disproportionated polylactic acid was separated by precipitating chloroform solution in methanol. The polymer obtained was separated by filtration, dried at 60° C. under reduced pressure. The polymer obtained was characterized by $^1$H NMR spectroscopy, gel permeation chromatography (GPC) and differential scanning calorimetry (DSC). The chemical structure of lactic acid-isosorbide copolymer and the incorporation of isosorbide into polylactic acid were determined by $^1$H NMR spectroscopy. The $^1$H NMR spectra is in good agreement with the chemical structure of lactic acid-isosorbide copolymer and the incorporation of isosorbide was found to be 1.88 g (94%). The solid lactic acid-isosorbide copolymer prepared by solution phase disproportionation was sieved and the particles passing through a 25 mesh screen were collected. The resulting semi-crystalline polylactic acid-isosorbide copolymer had an IV=0.81 dL/g, Tg=56° C., Tm=148° C. and crystallinity=34%.

The semi-crystalline polylactic acid-isosorbide copolymer was subjected to solid state polymerization conditions in a fluidized bed reactor under a flow of nitrogen at 100° C. for 1 hr, 120° C. for 2 hrs, 135° C. for 3 hrs, 145° C. for 2 hrs and 155° C. for 2 hrs.

The resulting copolymer had an IV=0.96 dL/g, Mn=69,600 g/mol, Mw=110,000 g/mol, polydispersity index (PDI)=1.58, Tg=74° C., Tm=185° C. and crystallinity=64%.

The incorporation of isosorbide to polylactic acid increases the Tg from 56 to 74° C., Tm from 148° C. to 185° C. and crystallinity from 34 to 64% respectively by solution disproportionation and solid state polymerization.

ADVANTAGES OF THE INVENTION

The present invention provides an improved method for the preparation of lactic acid-isosorbide copolyester with improved thermal properties.

What is claimed is:

1. A copolyester of lactic acid and isosorbide, having a weight ratio of lactic acid to isosorbide in the range of 99:1 to 50:50, the copolyester having an improved glass transition temperature (Tg) in the range of 64 to 74° C., melting temperature (Tm) in the range of 173 to 186° C. and crystallinity in the range of 58 to 64%.

2. The copolyester as claimed in claim 1, comprising 50 to 95 weight % lactic acid.

3. The copolyester as claimed in claim 1, comprising 5 to 50 weight % isosorbide.

4. The copolyester as claimed in claim 1, having an intrinsic viscosity (IV) in the range of 0.52 dL/g to 1.16 dL/g, a Number average molecular weight (Mn) in the range of 37,200 g/mol to 74,000 g/mol, a Weight average molecular weight (Mw) in the range of 58,500 g/mol to 120,000 g/mol and a polydispersity index (PDI) in the range of 1.48 to 1.62.

5. The copolyester as claimed in claim 1, wherein said copolyester is useful for preparing films or shaped articles, suitable for packaging of substances such as food, electronic equipment or medicines.

6. A copolyester of 50% to 95% by weight of lactic acid and 5% to 50% by weight of isosorbide, and having a glass transition temperature (Tg) in the range of 64° C. to 74° C., a melting temperature (Tm) in the range of 173° C. to 186° C. and crystallinity in the range of 58 to 64%.

7. The copolyester as claimed in claim 6, having an intrinsic viscosity (IV) in the range of 0.52 dL/g to 1.16 dL/g, a Number average molecular weight (Mn) in the range of 37,200 g/mol to 74,000 g/mol, a Weight average molecular weight (Mw) in the range of 58,500 g/mol to 120,000 g/mol, and a polydispersity index (PDI) in the range of 1.48 to 1.62.

8. A process for the preparation of a copolyester of lactic acid and isosorbide having a weight ratio of lactic acid to isosorbide in the range of 99:1 to 50:50, the copolyester having a glass transition temperature (Tg) in the range of 64° C. to 74° C., melting temperature (Tm) in the range of 173° C. to 186° C. and crystallinity in the range of 58% to 64%, said process being selected from the group consisting of:
(a) in situ ring opening polymerization of L-lactide with isosorbide;
(b) melt disproportionation of polylactic acid followed by the solid state polymerization; and
(c) solution disproportionation of polylactic acid followed by the solid state polymerization.

9. The process as claimed in claim 8, wherein said process is in situ ring opening polymerization of L-lactide with isosorbide which is conducted at a temperature in the range of 100° C. to 250° C.

10. The process as claimed in claim 8, wherein said process is melt disproportionation of polylactic acid at a temperature in the range of 100° C. to 250° C.

11. The process as claimed in claim 8, wherein said process is solution disproportionation of polylactic acid at a temperature in the range of 60° C. to 200° C.

12. The process as claimed in claim 8, wherein said process is in situ ring opening polymerization of L-lactide with isosorbide which is conducted in the presence of tin octoate.

13. The process as claimed in claim 8, wherein said process is melt disproportionation of polylactic acid which is conducted in the presence of titanium isopropoxide.

14. The process as claimed in claim 8, wherein said process is solution disproportionation of polylactic acid which is conducted in the presence of titanium isopropoxide.

* * * * *